(12) United States Patent
Ubaldi (10) Patent No.: US 12,364,203 B2
(45) Date of Patent: Jul. 22, 2025

(54) AGRICULTURAL HARVESTING MACHINE (71) Applicant: ROC S.R.L., Poggio Torriana (IT)

(72) Inventor: Raffaele Ubaldi, Santa Giustina (IT)

(73) Assignee: ROC S.r.l., Poggio Torriana (IT)

( * ) Notice: Subject to any disclaimer, the term of this patent is extended or adjusted under 35 U.S.C. 154(b) by 689 days.

(21) Appl. No.: 17/630,066

(22) PCT Filed: Jul. 21, 2020

(86) PCT No.: PCT/IB2020/056813
§ 371 (c)(1),
(2) Date: Jan. 25, 2022

(87) PCT Pub. No.: WO2021/019363
PCT Pub. Date: Feb. 4, 2021

(65) Prior Publication Data
US 2022/0264802 A1    Aug. 25, 2022

(30) Foreign Application Priority Data

Jul. 26, 2019   (IT) .......................... 102019000013002

(51) Int. Cl.
*A01D 78/08*    (2006.01)
*A01D 57/20*    (2006.01)
(Continued)

(52) U.S. Cl.
CPC ............. *A01D 78/02* (2013.01); *A01D 57/20* (2013.01); *A01D 80/00* (2013.01); *A01D 89/008* (2013.01); *A01D 84/00* (2013.01)

(58) Field of Classification Search
CPC ........ A01D 78/00–78/20; A01D 80/00–80/02; A01D 84/00; A01B 73/00–73/067
See application file for complete search history.

(56) References Cited

U.S. PATENT DOCUMENTS 3,695,015 A    10/1972   Twidale et al.
4,573,309 A *   3/1986   Patterson ............. A01D 80/005
                                                         56/192
(Continued)

FOREIGN PATENT DOCUMENTS

EP    1321022 A1 *  6/2003   ........... A01D 34/661
EP    2962540 A1 *  1/2016
(Continued)

OTHER PUBLICATIONS

Italian Search Report dated Mar. 13, 2020 from counterpart Italian Patent Application No. 102019000013002.
(Continued)

*Primary Examiner* — Joseph M Rocca
*Assistant Examiner* — Madeline I Runco
(74) *Attorney, Agent, or Firm* — SHUTTLEWORTH & INGERSOLL, PLC; Timothy J. Klima (57) ABSTRACT

An agricultural machine, includes a frame with a pair of wheels enabling movement in one direction, at least two harvesting devices for agricultural products connected to the frame that, in a work position, are arranged frontally to the wheels and aligned with each other transversely to the one direction. Unloading equipment is arranged operationally downstream of the harvesting devices to receive the harvested agricultural products and to move them in an unloading direction transverse to the one direction. The unloading equipment includes a central unloading device that is movable with respect to the harvesting devices between a work position, wherein it directly receives the harvested agricultural products from the harvesting devices, and a non-operational position, wherein offset with respect to the work position so as to enable the harvested agricultural products to fall immediately downstream of the first harvesting device.

7 Claims, 10 Drawing Sheets

(51) Int. Cl.
*A01D 78/02* (2006.01)
*A01D 80/00* (2006.01)
*A01D 84/00* (2006.01)
*A01D 89/00* (2006.01)

(56) References Cited

U.S. PATENT DOCUMENTS

| | | | | |
|---|---|---|---|---|
| 4,662,161 | A * | 5/1987 | Patterson | A01D 80/005 280/412 |
| 4,938,010 | A * | 7/1990 | Guinn | A01D 57/20 56/192 |
| 6,401,440 | B1 | 6/2002 | Franet et al. | |
| 7,628,004 | B2 * | 12/2009 | Geiser | A01D 84/00 56/192 |
| 10,827,678 | B2 * | 11/2020 | Ubaldi | A01D 67/005 |
| 2006/0248870 | A1 * | 11/2006 | Geiser | A01D 84/00 56/344 |
| 2006/0254244 | A1 * | 11/2006 | Geiser | A01D 84/00 56/370 |
| 2010/0031622 | A1 | 2/2010 | Frey | |
| 2010/0037584 | A1 * | 2/2010 | Dow | A01D 80/005 56/376 |
| 2016/0150717 | A1 * | 6/2016 | Speer | A01B 59/042 56/6 |
| 2018/0027733 | A1 * | 2/2018 | Ravaglia | A01D 84/00 |
| 2018/0116099 | A1 | 5/2018 | Dow et al. | |

FOREIGN PATENT DOCUMENTS

| | | |
|---|---|---|
| EP | 3150057 A1 * | 4/2017 |
| EP | 3357324 A1 | 8/2018 |
| FR | 2852485 A1 | 9/2004 |

OTHER PUBLICATIONS

International Search Report and Written Opinion dated Jul. 12, 2020 from counterpart International Patent Application No. PCT/IB2020/056813.

* cited by examiner

AGRICULTURAL HARVESTING MACHINE

This application is the National Phase of International Application PCT/IB2020/056813 filed Jul. 21, 2020 which designated the U.S.

This application claims priority to Italian Patent Application No. 102019000013002 filed Jul. 26, 2019, which application is incorporated by reference herein.

This invention relates to an agricultural machine, preferably of the type for harvesting long agricultural products such as hay, grass, straw, legumes, biomass products, and the like.

This invention therefore finds its main application in the agricultural sector, preferably in equipment provided with a device for harvesting and moving agricultural products designed to arrange the products according to the operator's specific needs.

An example of such harvesting devices is the rake (or windrower), i.e. a device provided with a harvesting or pick-up unit, extending transversely to one movement direction of the machine (traction or self-propelled), and a conveyor belt or auger unloading system, configured to convey the harvested products to the sides or rear of the machine.

These devices are usually provided with a frame, connected to a traction vehicle and equipped with wheels/tracks for moving, on which the operating units equipped with pick-up and unloading devices are mounted.

In particular, each operating unit generally extends along a direction orthogonal to the movement direction of the traction vehicle and comprises a harvesting device and a corresponding unloading device, belt or auger, designed to receive the harvested agricultural products and to move them transversely until they reach a lateral release zone.

In machines provided with a plurality of operating units, the latter can usually be moved in relation to the frame in a plurality of positions, allowing the operator greater versatility in the arrangement of the windrows.

Examples of such machines are, for example, known from the patent applications US2018/0116099 and EP3357324, in which multi-unit windrowers are shown in which the two lateral units are foldable in the transport position, also allowing the location of the unloading zone to be changed into a plurality of configurations.

Additional solutions of the known technique are published in patent documents FR2852485 and US2010/031622.

Disadvantageously, however, the solutions known to date only make it possible to move the windrows to the sides of the machine or, at most, to generate a central windrow from a pair of lateral windrows from which the corresponding operating units harvest the products.

There is currently no hybrid solution on the market that allows the operator to decide independently and without constraints where to place the windrows and how to direct the harvested products.

The purpose of this invention is, therefore, to provide an agricultural machine that can overcome the drawbacks of the prior art described above.

More precisely, the purpose of this invention is to provide a highly versatile and efficient agricultural machine.

Yet again, the purpose of this invention is to provide an agricultural machine with a high degree of automation and a plurality of operating configurations.

These purposes are achieved with an agricultural machine having features as disclosed herein, and, in particular, with an agricultural machine provided with a frame, at least two conveniently designed harvesting devices and unloading equipment.

The machine preferably comprises a frame provided with a pair of wheels designed to enable the movement of the agricultural machine in one movement direction; the wheels are placed side-by-side and spaced transversely in said movement direction.

The frame, therefore, has its own "track", defined by a distance between said two wheels evaluated orthogonally to the movement direction.

In addition, there are at least two harvesting (or pick-up) devices for agricultural products connected to the frame.

In at least one of their work positions, the harvesting devices shall be arranged in front of said wheels and aligned transversely to said movement direction.

Operationally downstream of the harvesting devices, there is unloading equipment designed to receive the harvested agricultural products and move them along an unloading direction; the unloading direction is transverse, preferably orthogonal, to the movement direction.

In at least one work position, the unloading equipment shall be placed between said harvesting devices and said wheels and shall comprise at least one central unloading device and two lateral unloading devices.

The central unloading device and two lateral unloading devices shall preferably be aligned transversely to said movement direction (preferably orthogonally to it).

According to one aspect of this invention, the central unloading device is movable in relation to the harvesting devices between said work position and a non-operational position.

In the work position, the central unloading device receives the harvested agricultural products from at least one first harvesting device (and/or from the lateral unloading devices).

In other words, in the work position, the central unloading device receives the products directly from said at least one first harvesting device; the harvested agricultural products, therefore, are moved by the first harvesting device directly onto the central unloading device (without passing over other unloading devices).

In the non-operational position, the central unloading device is offset in relation to the work position so as to enable the harvested agricultural products to fall immediately downstream of said at least one first harvesting device.

In other words, the central unloading device is movable in relation to the first harvesting device to enable the harvested products to fall directly downstream of the same.

Advantageously, this makes it possible to obtain additional operating configurations of the agricultural machine, which will be able to release the harvested products both at the sides of the two lateral unloading devices and at the zone left free by the central unloading device when it is in the non-operational position.

It should be noted that the central unloading device, in the work position, is preferably located inside the track of the frame in order to enable the harvested products to be released between the two wheels, without the wheels' pressing them as they pass.

According to a preferred aspect of this invention, the first harvesting device is arranged at the front of the central unloading device and has two edge portions placed near its first and its second end, respectively, both protruding laterally in relation to the central unloading device. These edge portions are preferably aligned with a corresponding wheel along the movement direction.

In this respect, the unloading equipment preferably comprises two conveyors arranged at the sides of the central unloading device, along said unloading direction, and each placed between an edge portion of the first harvesting device and the respective wheel in the movement direction.

In this way, by positioning the central unloading device in the non-operational position, the central harvesting device also harvests the products lying along the wheels' path unloading them inside and outside the track according to an operating direction of the conveyors.

Advantageously, this enables the agricultural machine's potential to be exploited to the maximum, avoiding, in addition, that the folding back of one or more of the harvesting devices is translated into a failure to collect and/or a mistaken unloading of the products lying along the wheels' path.

When the unloading devices are in the work position, the conveyors preferably define continuity elements along the unloading direction, which enable the movement of the products from one lateral unloading device to the other, passing through the central unloading device.

It should be noted, in this respect, that each conveyor preferably has a fixed position in relation to the frame, along said unloading direction.

Advantageously, this ensures that the harvested products, irrespective of the machine's operating configuration, are never released at the wheels of the frame where they would be squashed/pressed.

These and other characteristics, together with the related technical benefits, will be clearer from the following illustrative, and therefore non-limiting, description of a preferred, and thus non-exclusive, embodiment of an agricultural machine that has the features illustrated in the attached drawings, wherein.

With reference to the attached figures, the number 1 denotes, overall, an agricultural machine according to this invention.

In the embodiments illustrated, specific reference will be made to agricultural machines such as windrows or the like; in any case, the spirit of this invention encompasses all those agricultural machines, self-propelled or trailed, which have harvesting and unloading equipment designed to move and release the harvested products in a pre-defined unloading zone.

The agricultural machine 1 this invention relates to is preferably of the type provided with at least one frame 2, is configured to support a plurality of harvesting devices 4, 5, and is equipped with at least two wheels 3 (or tracks) designed to enable the movement of the machine 1 in a movement direction "A".

The harvesting devices 4, 5 are configured to perform processing in relation to a resting plane, or the ground, including, for example, the harvesting of long agricultural products (e.g. grass, straw, etc.).

The frame 2 preferably has, at one of its lower portions, said at least two wheels 3.

The two wheels are placed side-by-side and spaced apart transversely to said movement direction "A" arranged in a zone behind the agricultural machine, or operationally downstream of the harvesting devices 4 with reference to the movement direction "A". The distance between the two wheels 3, evaluated orthogonally to the movement direction "A", defines a track of the frame 2.

It should be noted, in this respect, that the track is preferably evaluated with reference to the median axis of the wheels or, in some cases, to the internal face of the wheels.

In the preferred embodiment, the frame 2 comprises, thus, a central body 2*a* that can be/is connected (mechanically and hydraulically) to the traction vehicle and two support elements 2*b* each connected to at least one wheel 3 (or track). Depending on the size of the agricultural machine, there may be more than one wheel connected to the same support element, thus defining "wheel groups". For descriptive simplicity, in the following, reference will, in any case, be simply made to the "wheels", including to define wheel groups connected to the same support element.

Preferably, the central body 2*a* is defined by an arm that, beginning from the support elements 2*b*, extends over the harvesting devices 4, 5 to connect to the traction vehicle. In the preferred embodiment, the arm defining the central body 2*a* has a curved shape.

The agricultural machine 1 also comprises at least two harvesting devices 4, 5 connected to the frame 2 that, in at least one work position, are arranged at the front of the two wheels 3 and are aligned transversely, preferably orthogonally, to the movement direction "A".

There is also unloading equipment 6 arranged operationally downstream of the harvesting devices 4, 5 to receive the harvested agricultural products and move them along the unloading direction "B" that is transverse, preferably orthogonal, to the movement direction "A".

Preferably, therefore, in the work position, the harvesting devices 4 and the unloading equipment 6 both extend in the unloading direction "B" and, with reference to the movement direction "A", in succession between them.

It should be noted that, preferably, the expression "harvesting device" 4, 5 refers to a device extending along a main direction (corresponding to said unloading direction "B" in use) and equipped with a plurality of rotating elements, each, in turn, equipped with at least one long harvesting tine 7 (or spring).

The harvesting elements are preferably arranged in succession along the extension direction spaced apart, preferably equally spaced apart.

Advantageously, in this way the harvesting elements are arranged along the extension of the device, increasing the useful portion of the same.

The tines 7 are preferably arranged about the same central rotation axis, radially oriented to it so that they radiate outwards.

In this respect, each harvesting device 4, 5 comprises a movement system for each of the harvesting elements along a closed trajectory that surrounds the above-mentioned central axis. Thus, the movement of the harvesting elements, together with the extension of the tines, defines a harvesting direction that is transverse, preferably orthogonal, to the extension direction of the harvesting device 4, 5.

In addition, each harvesting device 4, 5 comprises, preferably, a plurality of bands 8, arranged next to each other along said main direction and spaced apart from each other so that each harvesting element (i.e. each tine 7) is, at least in part, placed between two successive bands 8.

These bands 8 are preferably defined by curved elements shaped so as to surround the central axis at least at the forward stroke of the tines 7 (i.e. of the closed trajectory), guiding the products trailed by the harvesting elements towards a release zone.

The unloading equipment 6 for the harvested agricultural products is placed downstream of the harvesting devices 4 (in particular downstream of the release zone) configured to transport the agricultural products and release them laterally to (or, possibly, behind) the frame 2.

With reference to the movement direction "A" and in their work position, the unloading equipment 6 is placed between the wheels 3 of the frame 2 and the harvesting devices 4.

Structurally, the unloading equipment 6 comprises at least one central unloading device 9 and at least two lateral unloading devices 10 that, in their work position, are aligned with each other in the unloading direction "B".

The unloading equipment 6 preferably defines, in its work position, a resting plane for the harvested agricultural products and is movable along the unloading direction "B" in order to move the products until they reach one or more pre-determined unloading zones.

It should be noted that the central unloading device 9 and the lateral ones 10 can preferably be driven, at least in part, independently of each other, so that the products can be unloaded in several staggered zones along said unloading direction "B".

In the preferred embodiment, each central unloading device 9 or lateral one 10 comprises a conveyor belt 9a, 10a located operationally downstream of the harvesting devices 4, 5 and defining a resting plane for the harvested agricultural products.

In particular, the conveyor belt 9a, 10a defines a resting plane that is movable in the unloading direction "B", orthogonal to the movement direction "A" of the machine 1, to release the agricultural products to the sides or behind said movement equipment.

It should be noted that the expression "conveyor belt" refers to any cyclical movement apparatus that can define a movable resting plane for products, such as, for example, a chain, a crawler, or the like.

Alternatively, in any case, in place of conveyor belts and movable planes, the unloading equipment 6 could comprise auger systems, or systems of another kind, that can move the products transversely to the movement direction.

In addition, each central unloading device 9 or lateral one 10 preferably comprises (or is connected to) a side rail 9b, 10b rising transversely to the conveyor belt 9a, 10a (i.e. to the resting plane) in a distal position in relation to the harvesting devices 4, 5. This side rail is designed to prevent the harvested products from falling from the device before they should.

According to one aspect of this invention, the central unloading device 9 is movable in relation to the harvesting devices 4, 5 between said work position and a non-operational position.

In the work position, the central unloading device 9 directly receives the harvested agricultural products from at least one first harvesting device 4.

In the non-operational position, this central unloading device 9 is offset in relation to the work position so as to enable the harvested agricultural products to fall immediately downstream of said at least one first harvesting device 4.

In other words, the central unloading device 9 is preferably connected to at least one harvesting device 4, from which it receives the agricultural products in the work position, and it is movable/can be moved in relation to it between the above-mentioned two positions: the work position and non-operational position.

In this respect, the agricultural machine 1 preferably comprises a movement unit 11 operationally placed between said frame 2 and said central unloading device 9 and configured to move it between the work position and the non-operational position according to a command given by the operator.

In the preferred embodiments, the movement unit is hydraulic or pneumatic, for example, comprising one or more hydraulic cylinders.

Figure 2A:
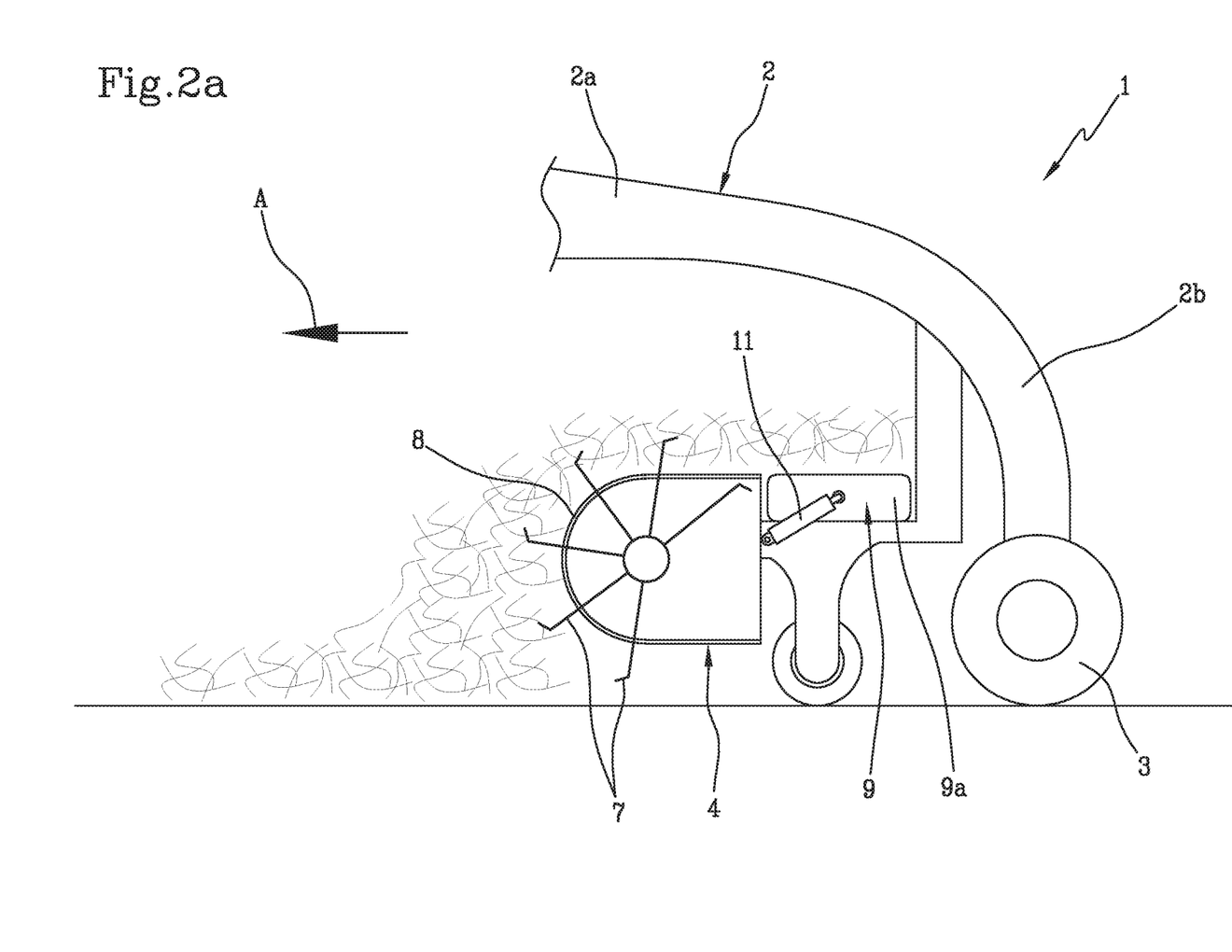
FIGS. 2*a* and 2*b* show respective schematic views according to the lines IIa-IIa of FIG. 1*a* and IIb-IIb of FIG. 1*b* of the agricultural machine in FIGS. 1*a* and 1*b* during use.
Figure 2B:
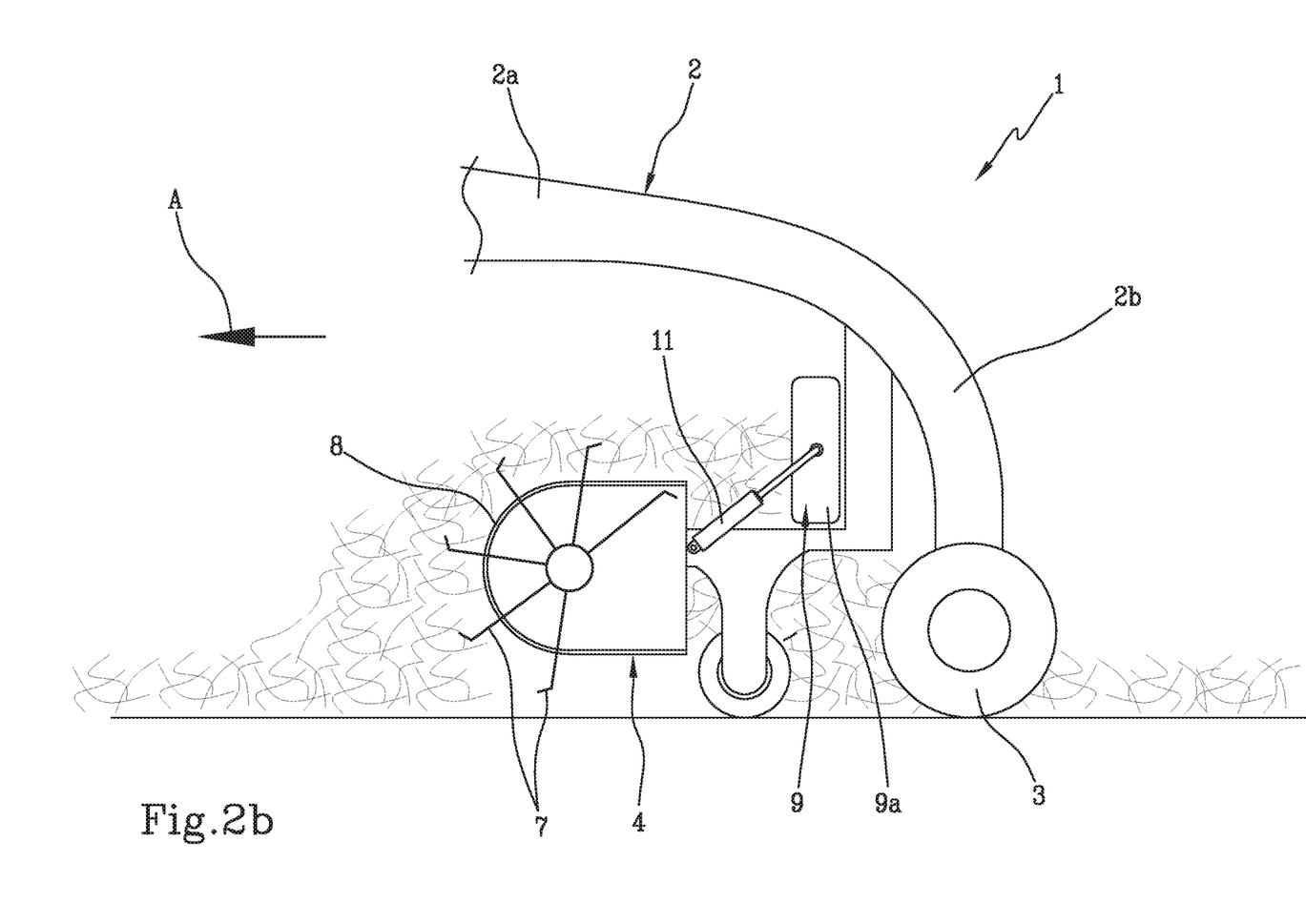
Figure 3:
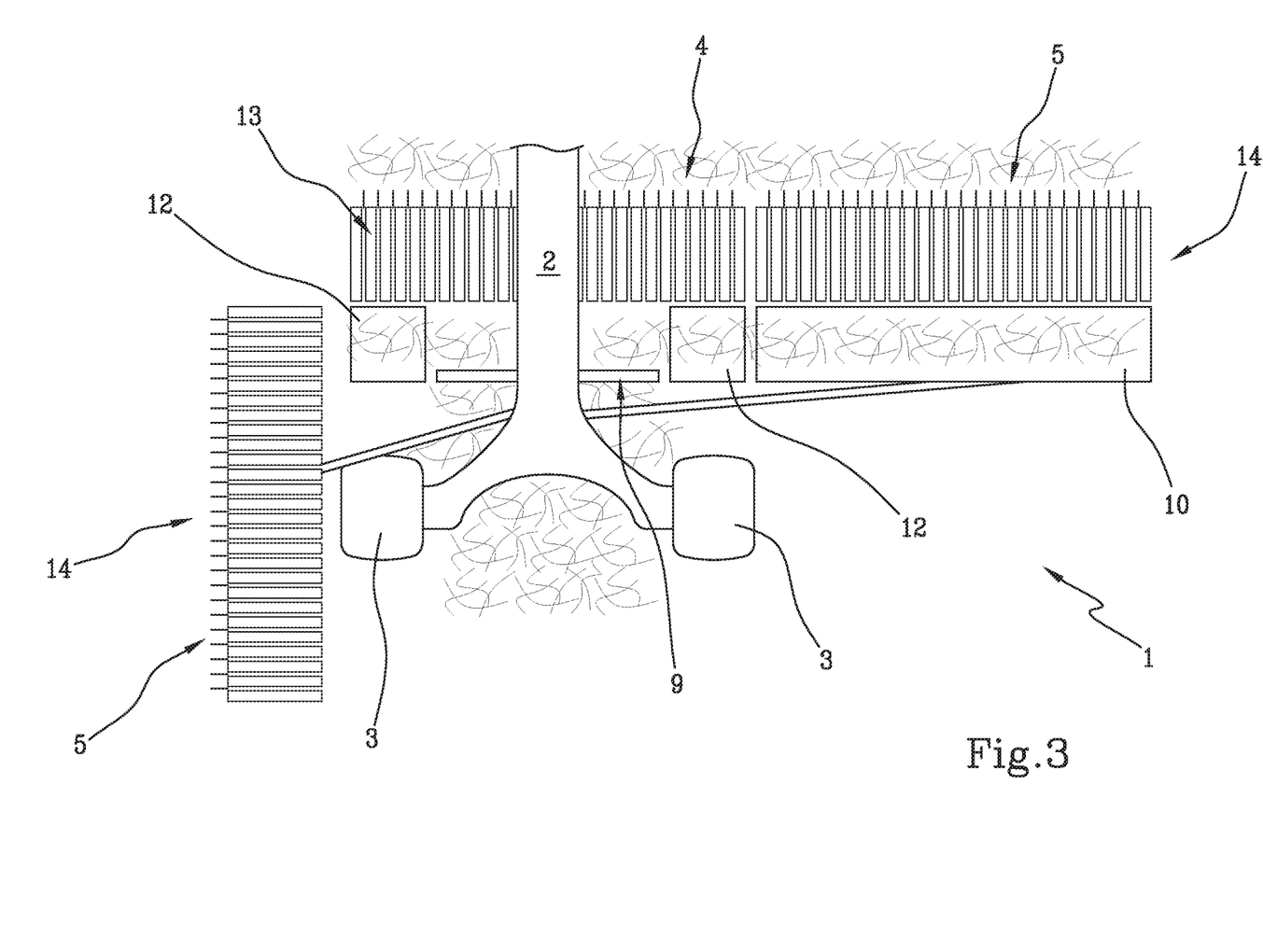
FIGS. 3 and 4 show two schematic plan views of the machine in FIG. 1*a* in two additional operating configurations.
Figure 4:
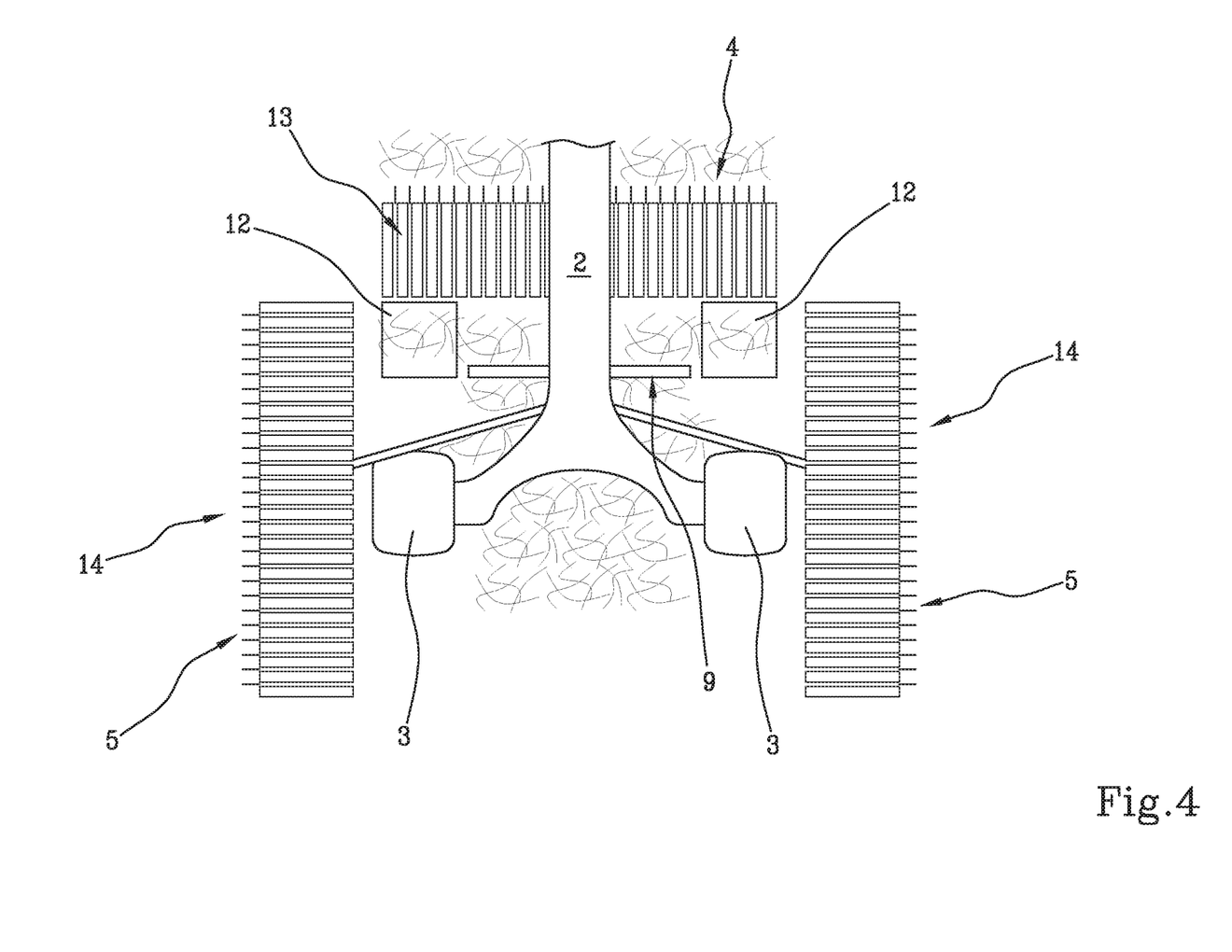

In the embodiment schematically illustrated in FIGS. 2a and 2b, the movement unit 11 is configured to rotate the central unloading device 9 between the work position, lowered, and the non-operational position, raised, wherein the resting plane is basically vertically oriented.

Alternatively, in any case, the movement unit and the connection between the central unloading device 9 and the frame 2 could be of another kind, enabling different movements and different positions to be obtained.

In another, alternative embodiment, the central unloading device 9 could be removably connected to the frame 2, so that it can be removed manually by the operator without any automated movement.

What is relevant for the purposes of this invention is that, in the non-operational position, the central unloading device 9 is sufficiently spaced from the corresponding first harvesting device 4 (i.e. the release zone) to allow the harvested products to fall immediately downstream of it.

It should be noted that the central unloading device 9, in its work position, is preferably located inside said track of the frame 2.

Therefore, when this central unloading device 9 is located in the non-operational position, the harvested products from the first harvesting device 4 are deposited in a central unloading zone along said track, or between the two wheels 3 of the frame 2.

Advantageously, in this way, the products directly unloaded by the first harvesting device 4 are deposited in the central unloading zone without the two (or more) wheels 3 squashing them (thus compromising the aeration thereof).

In addition, by also positioning the lateral unloading devices 10 in the work position (i.e. along the unloading direction "B"), it is possible to also move the remaining products, harvested by the other harvesting device/s 5, towards the same central unloading zone, facilitating the grouping of products in a single windrow.

This is particularly advantageous in that the same result could be obtained only by moving all the harvested products in a single direction (e.g. from right to left) with the risk that, especially for big machines, an excessive accumulation of agricultural products along the unloading direction leads to a jamming of the belt and/or to the products' falling in an uncontrolled manner.

It should be noted that the first harvesting device 4, arranged at the front of the central unloading device 9, extends transversely to the movement direction "A" between a first end 4a and a second end 4b.

The first end 4b preferably juts out laterally in relation to the central unloading device 9.

More preferably, the first harvesting device 4 has, near the first end 4a, an edge portion 4a' that juts out laterally from the central unloading device 9 and is aligned with a respective wheel 3 of the frame 2 in the movement direction "A".

In other words, in a preferred embodiment, the first harvesting device 4 has an extension transverse to the movement direction "A" that is greater than the corresponding central unloading device 9 and juts out in relation to it by an edge portion 4a' aligned with the wheel 3.

In this respect, the unloading equipment 6 preferably comprises a conveyor 12 that, at least is arranged in the unloading direction "B", laterally to the central unloading device 9 in its work position and placed between the edge portion 4a' of the first harvesting device 4 and the corresponding wheel 3 along the movement direction "A".

The conveyor 12 preferably has a fixed position with respect to the frame 2 in said unloading direction "B".

In other words, regardless of the position of the central unloading device 9, the conveyor 12 remains in its position in the unloading direction, even though it is suitably operated to facilitate the handling of the products.

Advantageously, in this way, irrespective of whether the other harvesting devices are operational, the first harvesting device 4 raises the products lying in a forward trajectory of the wheel 3 and, thanks to the action of the conveyor 12, moves them transversely to the movement direction "A".

Thus, the situation in which there are agricultural machine 1 operating configurations wherein the harvested products are harvested at the wheel 3, where they would be squashed and ruined, is avoided.

In the preferred embodiment (FIGS. 1a, 1b), the conveyor 12 is a belt or a rotating transport element of reduced dimensions compared to the central unloading device 9, next to it (in the work position) to occupy the space between the edge portion 4a' of the first harvesting device 4 and the corresponding wheel.

Figure 5:
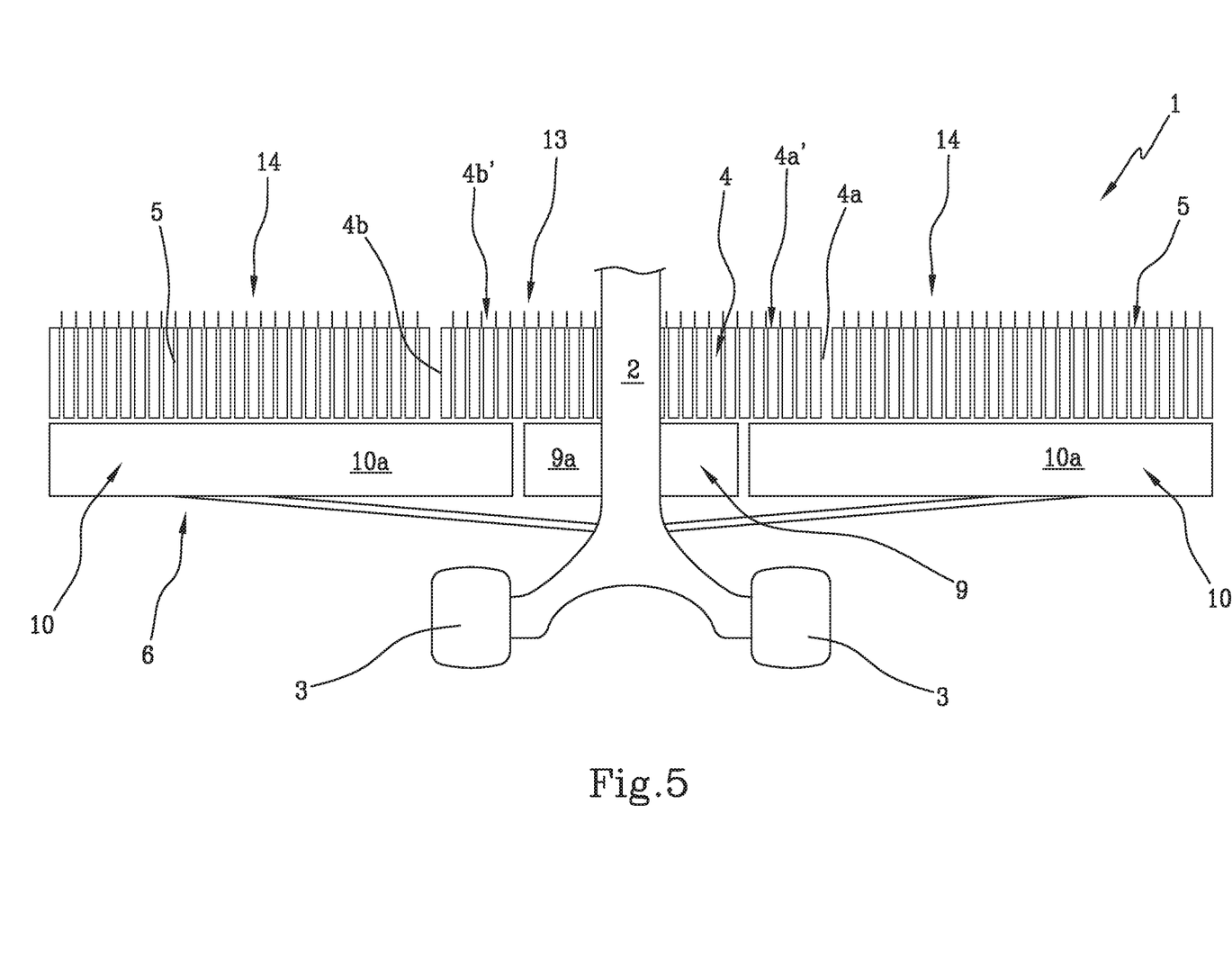
FIGS. 5 to 8 show schematic plan views of alternative embodiments of an agricultural machine according to this invention.

Alternatively, however, the conveyor could be defined by an end portion of the lateral unloading device 10 adjacent to the central unloading device 9, as illustrated in FIG. 5.

The preferred solution, in any case, is that which detaches the conveyor 12 from the lateral unloading device 10 so as to maximise the flexibility of the agricultural machine 1 and increase the number of operating configurations.

Figure 6:
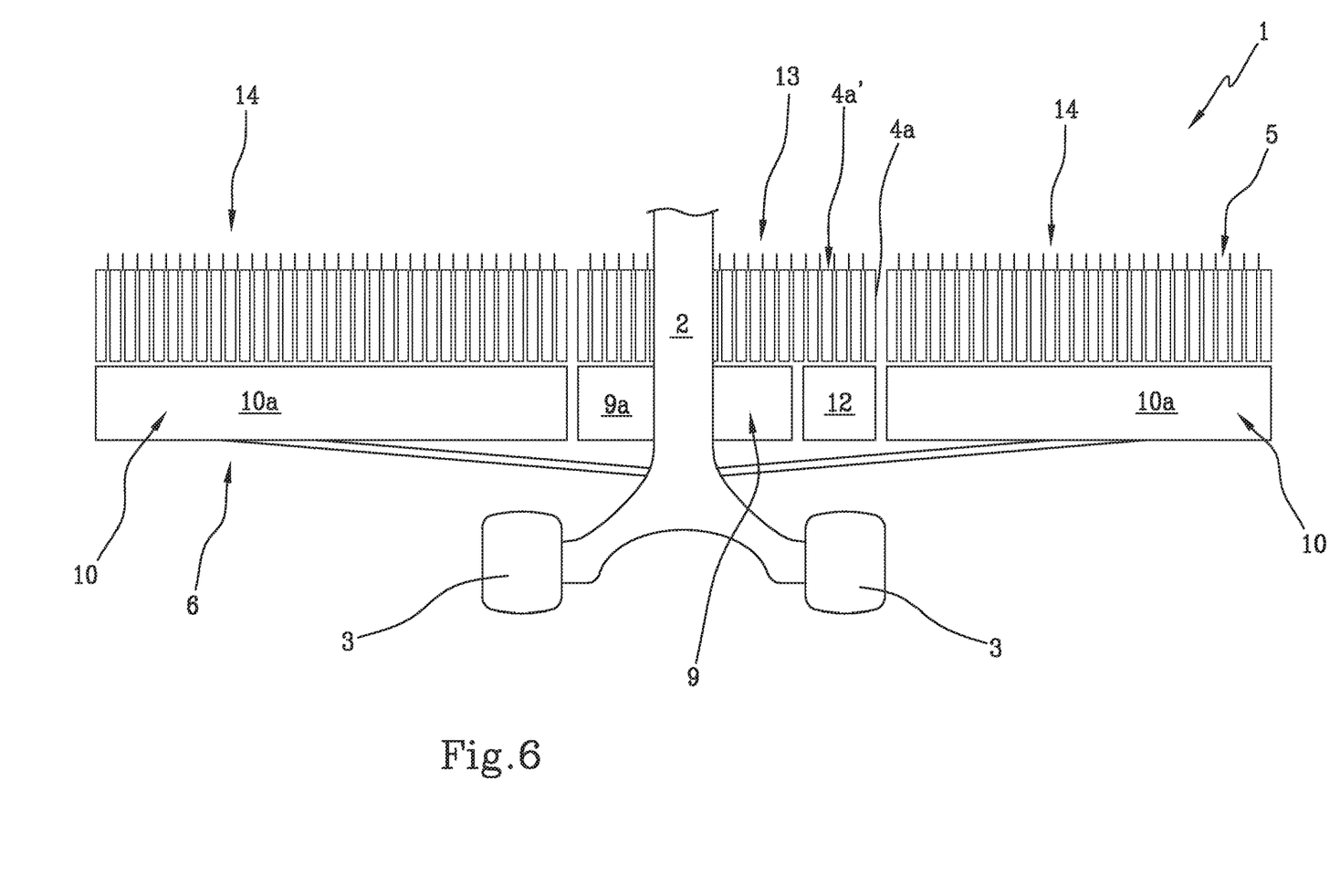
Figure 7:
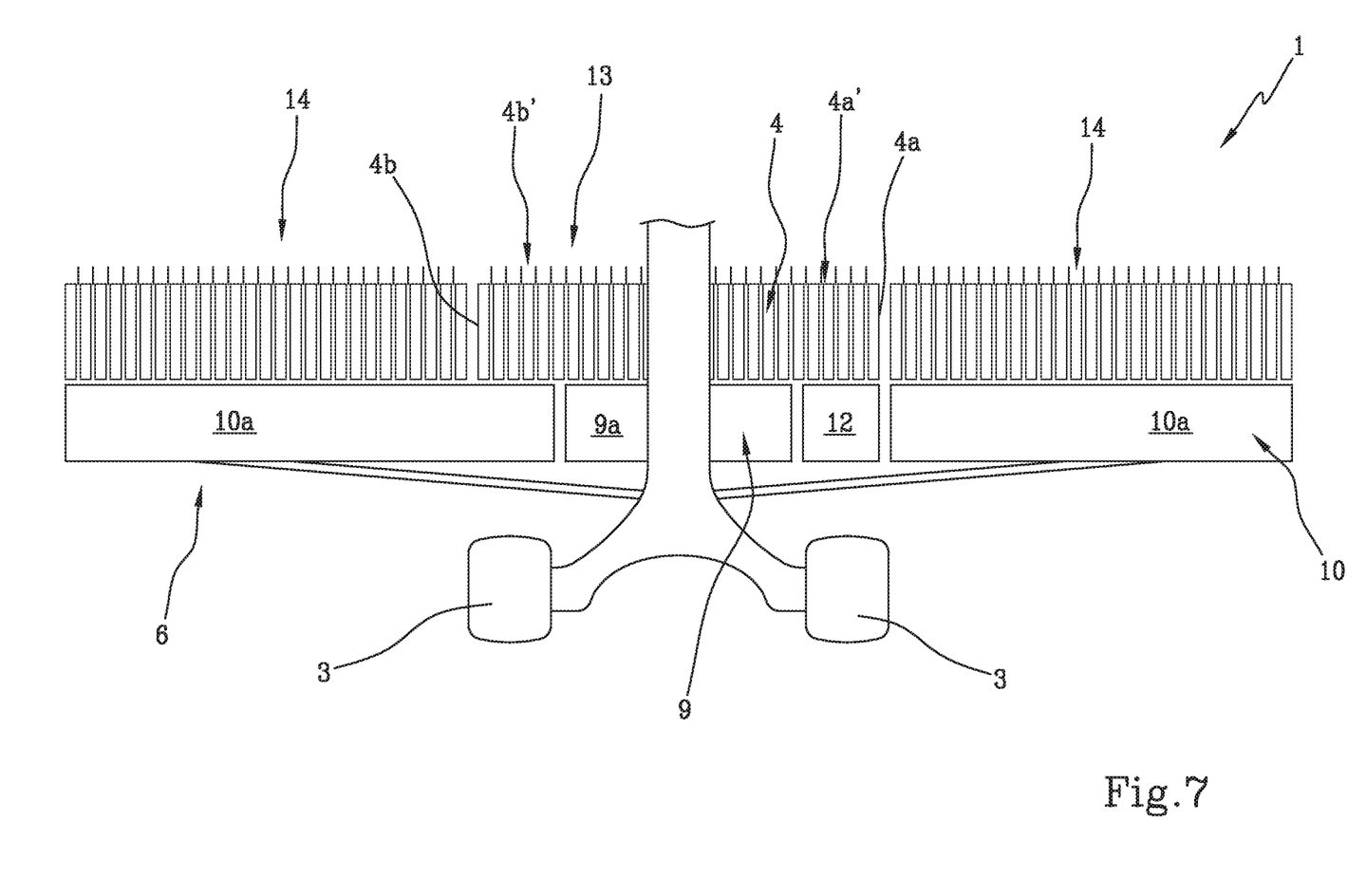

It should be noted that there could be just one conveyor 12, arranged at one side of the central unloading device 9 and at one single wheel 3 (FIGS. 6, 7), or there could be two (or more).

Figure 1A:
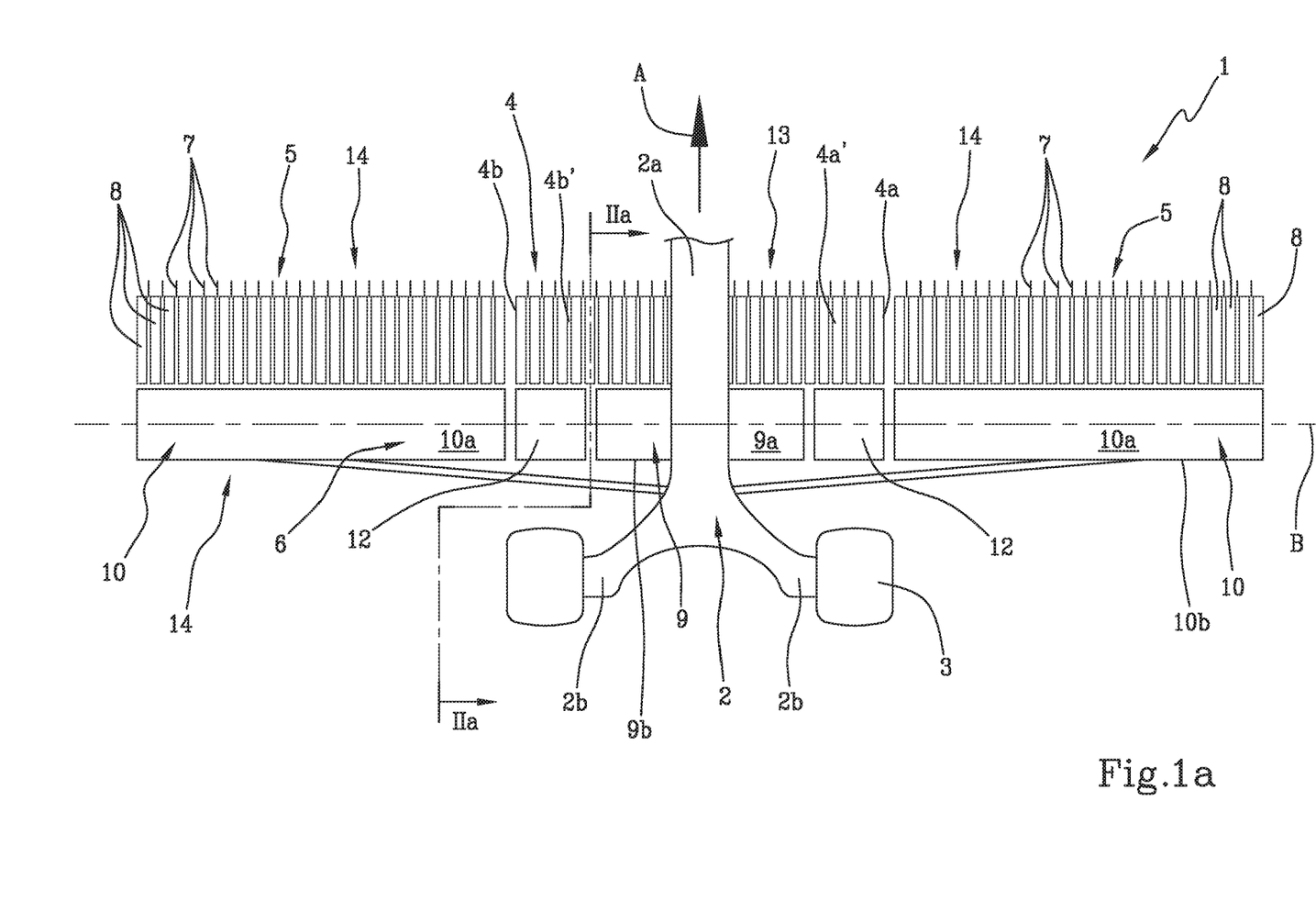
FIG. 1 shows a schematic plan view of an agricultural machine according to this invention, in a first operating configuration.
Figure 1B:
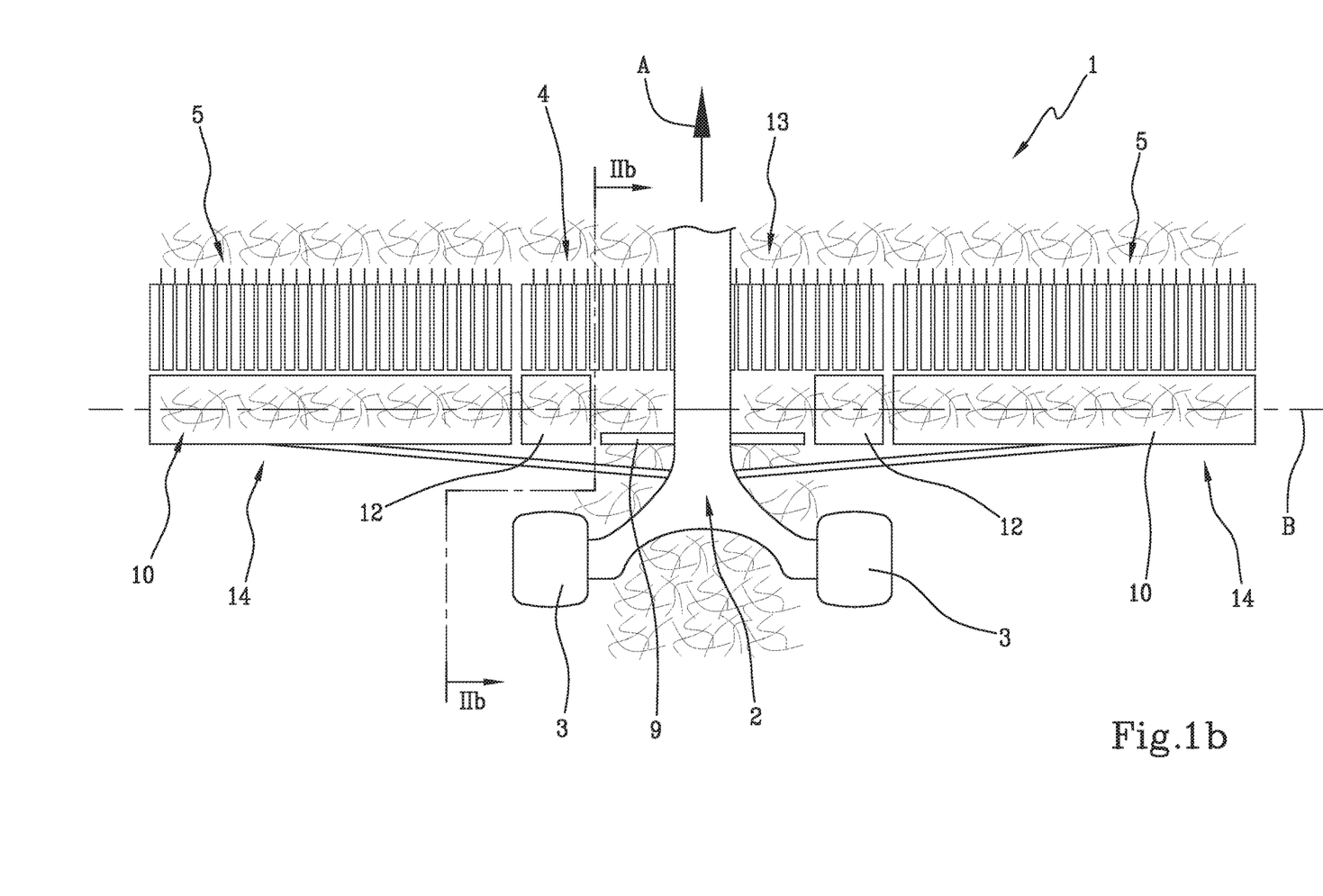
FIG. 1*b* shows a schematic plan view of the machine in FIG. 1*a* in a second operating configuration.

In the preferred embodiment, illustrated in FIG. 1a, there are two conveyors 12.

In this respect, the first harvesting device 4 preferably has two edge portions 4a', 4b' placed near the first 4a and the second end 4b, respectively.

In accordance with what is described above, preferably both the edge portions 4a', 4b' protrude laterally compared to the central unloading device 9 (on opposite sides) and each is aligned with a corresponding wheel 3 of the frame 2 in the movement direction "A".

Thus, the two conveyors 12 are arranged at the sides of the central unloading device 9 and each placed between an edge portion 4a', 4b' of the first harvesting device 4 and the corresponding wheel 3 in the movement direction "A".

It should be noted that the first harvesting device 4, together with the central unloading device 9 and, preferably, the conveyors 12 defines a central operating unit 13.

The agricultural machine 1 preferably also comprises two second harvesting devices 5 arranged at the sides of the first harvesting device 4, each preferably connected to a lateral unloading device 10.

Each conveyor 12 is, thus, placed between the central unloading device 9 and a lateral unloading device 10, in the unloading direction "B", when these are in their respective work positions.

In the embodiment illustrated, the two second harvesting devices 5 define, each with the corresponding lateral unloading device 10, two peripheral operating units 14.

In its preferred embodiment, thus, the agricultural machine 1 comprises a central operating unit 13 and two peripheral operating units 14.

The central operating unit 13 is equipped with a harvesting device (the first 4) and an unloading device (the central one 9) that can be removed, or is movable between the work position and the non-operational position described above.

The peripheral operating units 14 are equipped with a harvesting device (the second 5) and an unloading device (the lateral one 10). These peripheral operating units 14 are preferably movable, by means of appropriate (known) actuators, which are not described here, between a work and a transport configuration.

In the work configuration, the second harvesting device 5 and the lateral unloading device 10 are in their respective work positions, oriented transversely to the movement direction "A" and parallel to the unloading direction "B".

In the transport configuration, the second harvesting device 5 and the lateral unloading device 10 are folded back in said movement direction "A" to reduce the transverse dimensions of the agricultural machine 1.

It should be noted that, in one alternative embodiment (illustrated in FIG. 8), the agricultural machine 100, always provided with its own frame 20 and at least two wheels 30, could have two first harvesting devices 40, both provided with a central portion 40a facing the central unloading device 90, and an edge portion 40b, a lateral one, facing a corresponding lateral unloading device 91.

Figure 8:
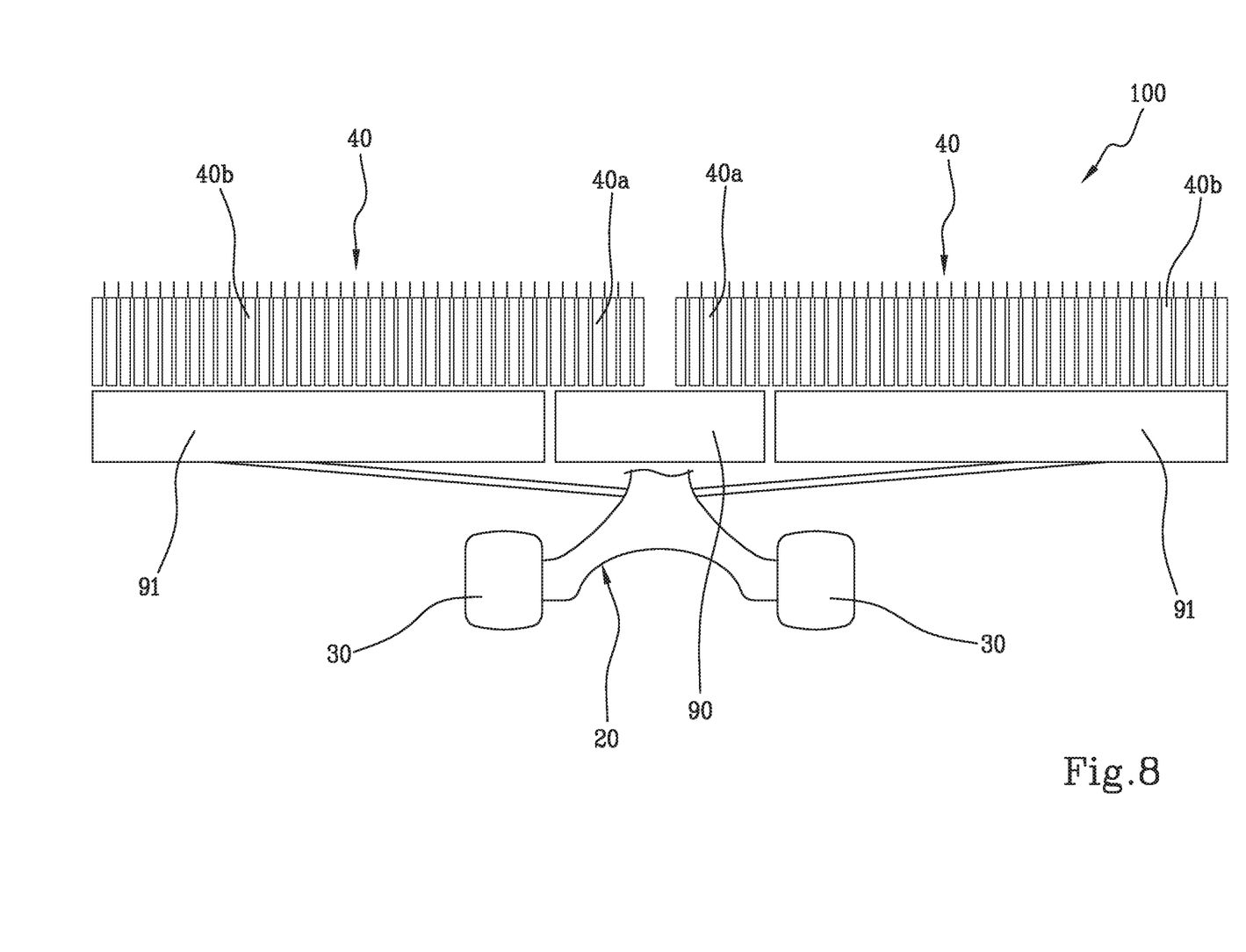

The two edge portions 40b have, in this embodiment, an extension transverse to the movement direction basically equal to the width of the corresponding lateral unloading device 91.

The invention achieves its intended purposes and significant advantages are thus obtained.

In fact, the presence of a removable central unloading device, decoupled from the corresponding harvesting device, allows the operator to have maximum operational flexibility, allowing the windrow positioning to be varied in a completely arbitrary way and without any particular operational constraints.

The presence of a movement unit designed to move the central unloading device in an automated way, moreover, facilitates the execution of this operation during use, reducing machine downtime and increasing productivity.

Furthermore, the presence of "punctual" conveyors or little belts located at the wheels, i.e. aligned with them along the movement direction, makes it possible to avoid the unloading of products along the wheels' path, while still providing maximum flexibility to the operator without the risk of compromising product quality.

The invention claimed is:

1. An agricultural machine, comprising:
   a frame including a pair of wheels configured to enable movement of the agricultural machine in one direction of movement and placed side-by-side and spaced transversely in the direction of movement;
   a central operating unit including a central harvesting device and a central unloading equipment;
   two peripheral operating units, each including a peripheral harvesting device and a peripheral unloading device, each of the peripheral operating units being movable between a work configuration, in which the respective peripheral operating unit is aligned to the central operating unit and oriented transversely to the direction of movement, and a transport configuration, in which the respective peripheral operating unit is folded back in the direction of movement to reduce transverse dimensions of the agricultural machine;

wherein the central harvesting device is arranged frontally to the wheels and the central unloading equipment is arranged operationally downstream of the central harvesting device to receive harvested agricultural products and to move the harvested agricultural products in an unloading direction transverse to the direction of movement, wherein, in at least one work position, the central unloading equipment:

is placed between the central harvesting device and the wheels, and comprises at least one central unloading device and at least one conveyor arranged in the unloading direction, laterally to the at least one central unloading device in the at least one work position;

wherein:

the at least one central unloading device is movable with respect to the central harvesting device between the at least one work position, wherein the at least one central unloading device directly receives the harvested agricultural products from the central harvesting device, and a non-operational position, wherein the at least one central unloading device is offset with respect to the at least one work position to enable the harvested agricultural products to fall immediately downstream of the central harvesting device;

the at least one conveyor has a fixed position with respect to the frame;

the frame has a track defined by a distance that lies between the two wheels orthogonally to the direction of movement, with the at least one central unloading device, in the at least one work position, placed inside the track;

the central harvesting device has a dimension, evaluated along the unloading direction, greater than the track;

the at least one conveyor has a reduced dimension, evaluated along the unloading direction, compared to the at least one central unloading device to occupy a space between at least one end portion of the central harvesting device and a corresponding wheel of the frame.

2. The agricultural machine according to claim 1, wherein the central harvesting device is arranged in front of the at least one central unloading device and extends transversely to the direction of movement between a first end and a second end, wherein the first end extends out laterally with respect to the at least one central unloading device.

3. The agricultural machine according to claim 2, wherein the central harvesting device includes, near the first end, the at least one end portion, the at least one end portion extending out laterally from the at least one central unloading device and being located in front of a respective one of the wheels in the direction of movement.

4. The agricultural machine according to claim 3, wherein the at least one end portion includes two end portions placed respectively near the first end and the second end, both of the two end portions protruding laterally with respect to the at least one central unloading device and each of the two end portions being positioned in front of the respective one of the wheels in the direction of movement.

5. The agricultural machine according to claim 4, wherein the at least one conveyor includes two conveyors arranged respectively at sides of the at least one central unloading device, in the unloading direction, with each of the two conveyors being placed between a respective one of the two end portions and the respective one of the wheels in the direction of movement.

6. The agricultural machine according to claim 5, wherein each of the two conveyors is placed, in the unloading direction, between the at least one central unloading device and a peripheral unloading device in the at least one work position.

7. The agricultural machine according to claim 1, further comprising a movement unit operationally placed between the frame and the at least one central unloading device and configured to move the at least one central unloading device between the at least one work position and the non-operational position according to a command given by an operator.

* * * * *